United States Patent
Snyder

(10) Patent No.: US 6,415,246 B1
(45) Date of Patent: Jul. 2, 2002

(54) METHOD FOR LIMIT CHECKING

(75) Inventor: Timothy C. Snyder, Piscataway, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/371,032

(22) Filed: Aug. 10, 1999

(51) Int. Cl.[7] .............................. H04B 10/08
(52) U.S. Cl. ....................... 702/193; 356/71
(58) Field of Search ................ 702/193, 197, 702/123, 189; 356/71–73; 359/110; 73/1.01, 1.56; 385/28, 100; 340/850–852, 870, 514, 425.1, 815.57; 379/1.01–1.04, 4, 26.01, 27.03, 29.02; 345/418; 455/423, 424, 426, 67.1

(56) References Cited

U.S. PATENT DOCUMENTS

| | | | | |
|---|---|---|---|---|
| 4,761,748 A | * | 8/1988 | Le Rat et al. | 714/822 |
| 5,500,941 A | * | 3/1996 | Gil | 714/38 |
| 5,764,726 A | * | 6/1998 | Selig et al. | 379/21 |
| 5,862,477 A | * | 1/1999 | Wellard et al. | 455/423 |
| 5,870,667 A | * | 2/1999 | Globuschutz | 455/67.1 |
| 6,061,021 A | * | 5/2000 | Zibell | 342/418 |
| 6,088,588 A | * | 7/2000 | Osborne | 455/425 |
| 6,175,560 B1 | * | 1/2001 | Bhagalia et al. | 370/342 |

* cited by examiner

Primary Examiner—Marc S. Hoff
Assistant Examiner—Edward Raymond

(57) ABSTRACT

A device and method is provided for automatically validating test measurements of an optical entity in an optical transmission network. The method includes creating an object in a database that includes a test variable. In addition, a limit relating to the test variable value is included. The method further includes comparing the test variable value against the limit and indicating if the test variable violates the limit. The device includes a computer memory containing data that relates to performance testing. The data comprises a test identifier, a test variable identifier and a plurality of independent variable identifiers.

42 Claims, 3 Drawing Sheets

METHOD FOR LIMIT CHECKING

CROSS-REFERENCES TO RELATED APPLICATIONS

This invention relates to the following co-pending applications, each of which are incorporated by reference:

"Method for Collecting Test Measurements", Ser. No. 09/371,036, filed Aug. 10,1999; and "Method for Managing Test Measurements", Ser. No. 09/371,037, filed Aug. 10, 1999.

FIELD OF THE INVENTION

The present invention relates to an automated testing system. More specifically, the present invention relates to a method for validating test measurements for an optical entity.

BACKGROUND OF THE INVENTION

In a submarine optical communication system, optical signals transmitted through the submarine optical fiber cable become attenuated over the length of the cable, which may stretch thousands of miles. To compensate for this signal attenuation, optical repeaters are strategically positioned along the length of the cable.

Moreover, optical signals transmitted through the submarine optical fiber cable must sometimes be transferred to a branching cable. To accomplish this task, optical branching stations are positioned at necessary locations along the length of the cable.

Submarine optical repeaters and branching stations must be designed to protect against the hazards presented by harsh undersea environments. These hazards can include corrosion, erosion, wide ranging seawater pressures and temperatures, and mechanical damage due to earthquake shocks, biological attack, and fatigue. Moreover, because of the difficulties associated with their delivery and installation, and the criticality of their telecommunication function, submarine optical repeaters and branching stations are typically designed to have relatively long, and maintenance-free operating lives.

Moreover, devices such as optical repeaters and branching stations are typically tested to verify that they have been manufactured according to specifications. These tests can be automated. Known automated testing systems can employ computer hardware and software to drive instruments that make measurements of a device's performance in response to changes in an independent variable. Some measurements can be gathered simply for informational purposes. Other measurements can be checked, or validated, against a set of limits. If all the measurements requiring validation pass, the device is deemed acceptable and shipped to the next stage of production. If any measurements fail validation, the device is typically sent to the test engineer for investigation.

Known automated testing systems are designed to vary only one independent variable before each repetition of a test. After making such a variation, a dependent or "test" variable is measured to determine the effect of the variation of the independent variable on that test variable. Thus, the known automated testing systems assume that all test variable measurements are discrete points and are not dependent upon an array (or arrays) of independent variables. For simple tests this can suffice. However, some devices require that more than one independent variable be changed simultaneously, resulting in a multidimensional nature to the measurement data. Yet, the data structures of the known automated testing systems are incapable of handling multi-dimensional data. Thus, there is a need for an automated testing system that can simultaneously vary more than one independent variable, and can collect, store, and report test variable measurement data related to those variations.

Also, in the known automated testing systems each test is responsible for validating its measurements as they are made. Thus, for each test, the programmer of that test's script must build routines that obtain limits and compare them to corresponding test variable measurement values as those values are collected. Since each test is responsible for validation, each test script programmer typically develops a somewhat unique way to perform the validation. Moreover, each test script programmer often develops a unique method for naming the elements of the data structure that contain the test variable measurement values and the limits used to check those values. Thus, there is little standardization among test scripts or their data structures, and therefore modifying a test script, particularly an older one for which the original programmer is unavailable to assist, can be a challenging endeavor.

Additionally, because the method for applying limits is programmed into the test script at design time, there is no opportunity to change that method after the release of the test script without reworking and recompiling the test script's code. For example, if measurements that were previously gathered simply for information purposes now need to be checked against limits, the source code for the test script must be modified, rebuilt, and re-released.

Moreover, in the known automated testing systems, because the validation or limit checking routines are integral to the test scripts, measurement data can only be checked at the time of testing. Due to this coupled nature of measuring and validating, if limits change, product must be retested to determine if it meets the new limits.

Furthermore, the limit checking portions of the known automated testing systems determine the limit values to apply to the test variable measurement data based on a wide variety of schemes, including:

Explicitly defined minimum and maximum values;

Nominal value with a +/− tolerance;

Nominal with a positive tolerance and separate negative tolerance;

Nominal with a +/− percentage; and

Nominal with a positive percentage and separate negative percentage.

The specific scheme is hard-coded within the local limit checker. If the test script programmer assumed a balanced +/− tolerance, and later it is determined that a different value is needed for the positive and negative terms, the original source code must be reworked, rebuilt and re-released.

The known automated testing systems require that limits be provided for each and every value of the independent variable used during the test. For example, if measurements are made at 32 points and the operator wants to check the test variable at only the endpoints (points #1 and #32), limits must be provided for all 32 points (resulting in thirty extra lines in the file to be maintained by the test engineer).

Because of measurement error it is possible for a measured value to appear to fall within the specified limits when in actuality, if the measurement were repeated several times, the average measured value would fall outside one of the limits. Thus, the limits used by the automated testing system should account for measurement error. However, the known automated testing systems do not provide a means for adjusting the limits, but instead expect the limits provided to the automated testing system to be adjusted for measurement error beforehand. Yet the error for a measurement can vary from one batch to another, and from one independent variable value to another, so a global change to the limits would not suffice.

Known automated testing systems are unable to check measurement data against non-numeric limits. For example, some instruments return hexadecimal numbers, such as A4D9. Other instruments indicate status or measurement results via LED indicators that glow in colors such as red, green, yellow, or blue. However, because the known automated testing systems do not allow non-numeric data to be checked against non-numeric limits, the information provided by these instruments must be converted by the operator into a numeric value before entry and limit-checking. This conversion process can be time-consuming and error-prone.

SUMMARY OF THE INVENTION

Embodiments of the present invention provide a method for validating test measurements. The method includes building an object that includes a test variable value, and a limit related to the test variable value, comparing the test variable value against the limit, and indicating if the test variable violates the limit.

BRIEF DESCRIPTION OF THE DRAWINGS

The various features of the invention will best be appreciated by simultaneous reference to the description which follows and the accompanying drawings, in which.

DETAILED DESCRIPTION

Embodiments of the present invention provide a method for validating test measurements. The method includes building an object that includes a test variable value, and a limit related to the test variable value, comparing the test variable value against the limit, and indicating if the test variable violates the limit.

As used herein, the phrase "optical entity" can refer to any device or system which is intended to operate using the physics of optics, including devices such as repeaters and branching stations.

Figure 1:
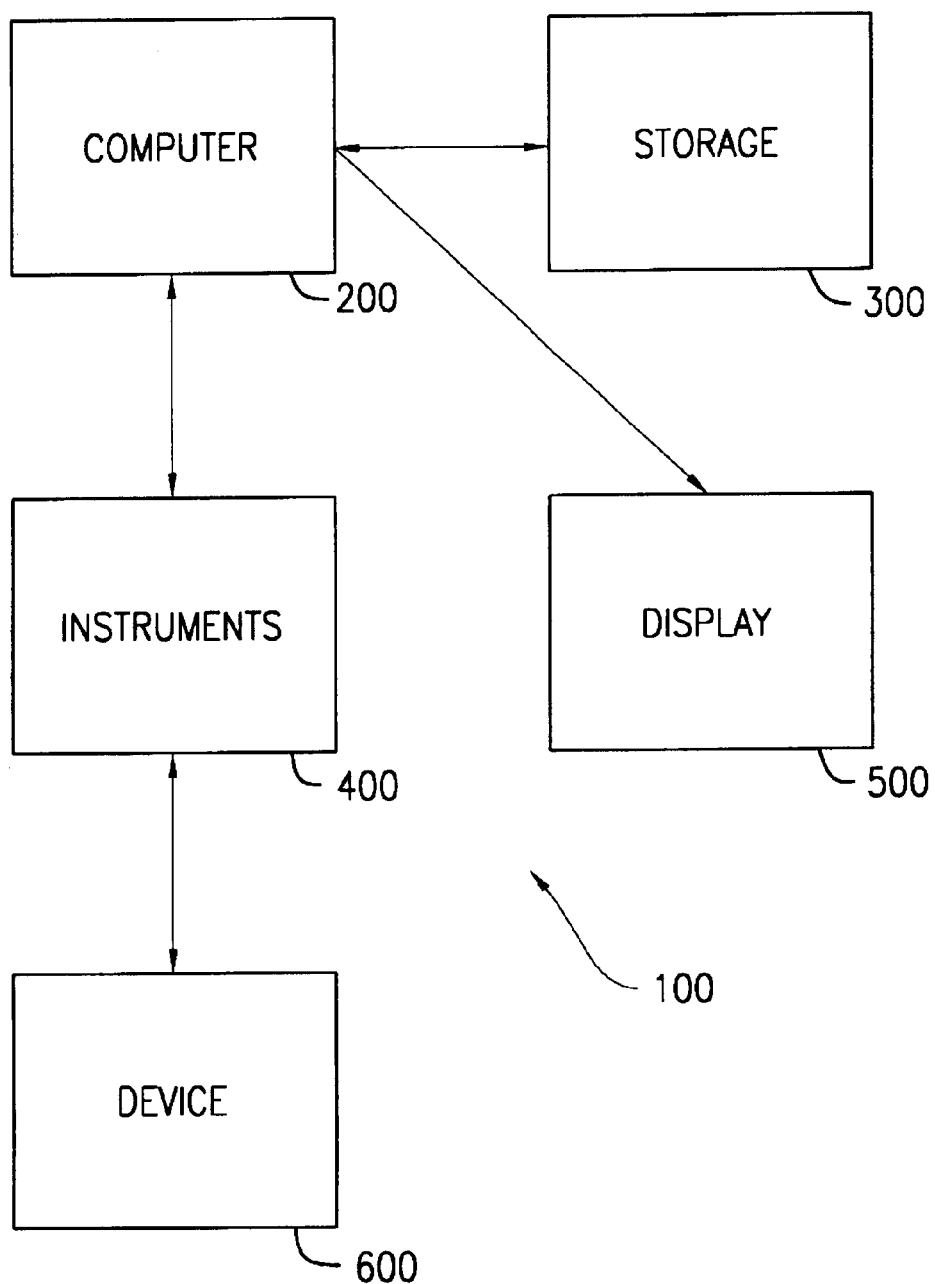
FIG. 1 is flowchart of one embodiment of a method of the present invention.

FIG. 1 provides a block diagram of an automated test system 100 of the current invention. An operator can interact with computer 200 to identify the test of interest. Computer 200 can access storage 300 to relate the test of interest to the test variable and the independent variables. Based on instructions from computer 200, instruments 400 can control the independent variables experienced by device 600. Also, instruments 400 can measure values for the test variable and report them to computer 200, which can store them in storage 300.

Computer 200 can calculate limits for the measured values, or can retrieve them from storage 300. Computer 200 can also compare the measured values against the limits to determine whether the limits are violated. Results of this comparison can be stored in storage 300 and/or displayed to the operator on display 500.

Figure 2:
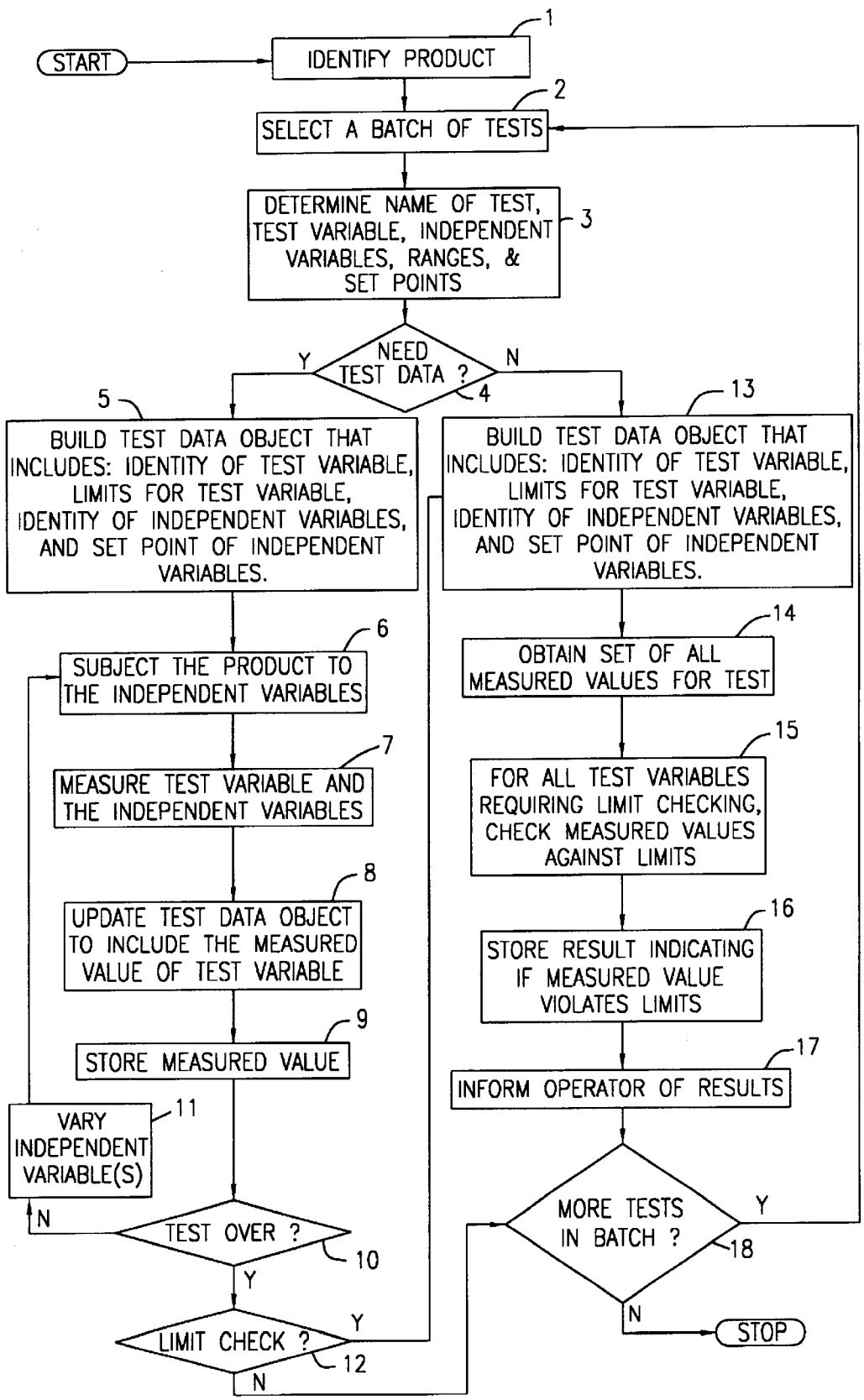
FIG. 2 is a block diagram of an automated test system of the present invention.

FIG. 2 is a flowchart illustrating a method of using an automated testing system 100. A brief description of FIG. 2 will be followed by a more detailed description.

At step 1, the operator can identify the product of interest.

At step 2, the operator or computer can identify a batch of tests associated with the product. A batch of tests can include any number of tests. Steps 2 through 18 can be repeated for each test in the batch.

At step 3, for a given test, the computer determines the test's name, test variable, independent variables, and ranges for those independent variables.

At step 4, a determination is made whether test data is needed. Test data would be needed except in those situations where existing test data are already available to be limit checked. If test data is not needed, then the process continues at step 13, which will be described below.

If test data is needed, at step 5 the computer can build a test data object that includes an identity of the test variable, the limits for the test variable, the identity of the 5 independent variables, and for most or all of the independent variables, at least one set point for each independent variable.

At step 6, the computer, via instrument drivers, can instruct instruments to subject the product to the independent variables.

At step 7, the computer, via instrument drivers, can instruct the instruments to measure the test variable.

At step 8, the computer updates the test data object to include the measured value of the test variable.

At step 9, the measured value is stored.

At step 10, a determination is made regarding whether the test has been completed.

If the test has not been completed, at step 11 one or more of the independent variables is varied. Then, the process returns to step 6 and continues executing steps 6 through 9 until step 10 determines that the test is over.

At step 12, a determination is made regarding whether limit checking is desired. If limit checking is desired, then the process continues with step 13. If limit checking is not desired, then the process continues at step 18, which will be described below.

At step 13, another test data object can be built. This test data object can include an identity of the test variable, the limits for the test variable, the identity of the independent variables, and for most or all of the independent variables, at least one set point for each independent variable.

At step 14, the computer can obtain a set of all the measured values of interest for the test.

At step 15, the computer can identify all the test variables in the set that require limit checking, and can check the measured values against the limits.

At step 16, the computer can store a result indicating whether the measured value violates the limits for the test variable to which the measured value corresponds.

At step 17, the computer can inform the operator of the result of step 16.

At step 18, a determination is made regarding whether there are more tests in the batch. If there are more tests in the batch, then the process continues at step 2. If there are not more tests in the batch, then the process stops.

The process for implementing automated testing system 100 can include additional sub-steps, subsystems, and details. For example, all of the steps of FIG. 2 can be managed by a hardware/software system called the "test executive." Steps 5 through can be managed by a sub-system of the test executive called the "test executable." Steps 13 through 17 can be managed by a sub-system of the test executive called the "limit checker."

Moreover, step 1 can be preceded by the operator logging onto a security subsystem of the test executive that verifies the identity of the operator. The operator can access a menuing subsystem of the test executive to load the product. This can involve connecting the product to the test instruments, initializing the product and instruments, and calibrating the instruments.

At step 2, the operator can access a menu system to select a sequence of tests to be performed against the product. This sequence of tests is referred to as the batch. For each product, there can be a standard batch for standard product plus several custom batches that can define customized test sequences for rework or experiments. The operator can refer to written documentation to determine which batch to select.

At step 3, for a given test, the computer determines the test's name, test variable, independent variables, and ranges for those independent variables. This determination can be accomplished by first determining the test's name, and then querying a specification table that relates the "recipe" for the test, i.e., the test variable, independent variables, and independent variable ranges, to the test name. Thus, the test executive can retrieve the recipe for the given test in the batch.

At step 4, the test executive can determine, based on the batch selected by the operator in step 2, whether test data needs to be generated and collected.

If test data needs to be generated, the test executive can obtain the limits for the test and start the test executable. The limits can come from a limit file, table, or database. The test executive can send the recipe and the limits to the test executable as command line switches.

At step 5 the test executable can build the test data object. This test data object can be registered with a "database interface" located in an "environment module." The database interface can insulate the higher level tasks (i.e., the test executive, the test executable, and the limit checker) from the details of SQL statement parsing. Also, the database interface can isolate the higher level tasks from the specifics of the database structure, allowing the database to be modified without impacting higher level processes. The database interface can be used to retrieve information from various database tables. The database interface uses the test name and recipe version number to determine which tables and which records within those tables correspond to the test.

The database interface can also be used to log test measurements. In that situation, destination tables are determined from the test name. Although not shown in FIG. 2, prior to test measurement logging at step 9, the test measurement can be sent to the limit checker (steps 13–15) for validation.

At step 6, the test executable can issue configuration commands to the instrument drivers. The instrument drivers can provide a human readable interface to a piece of test instrumentation. The instrument drivers can also insulate the test executable from the details of hardware bus communication and error trapping. The commands issued by the instrument drivers can configure the instruments. Based on these commands, the instruments attempt to hold each independent variable at that independent variable's setpoint, with a reasonable allowance made for drift.

At step 10, the test executable can determine whether the test has been completed. This determination is made by comparing the number of measured values stored to the number of entries for the range.

If the test has not been completed, at step 11 one or more of the independent variables is varied. This variation can be based on the range entries, can be calculated, or can be random.

At step 12, a determination is made regarding whether limit checking is desired. If limit checking is desired, then the process continues with step 13. If limit checking is not desired, then the process continues at step 18, which will be described below.

At step 13, another test data object can be built. This test data object can include an identity of the test variable, the limits for the test variable, the identity of the independent variables, and for most or all of the independent variables, at least one set point for each independent variable.

At step 14, the limit checker subsystem of the test executive can obtain a set of all the measured values of interest for the test. The limit checker can use the test name and recipe to construct limit objects for all expected test points. These limit objects can be organized into a limit map for each test point name. Each of these limit maps can then be collected into a certification map that can cover all test point names for the current test.

At step 15, the limit checker can identify all the test variables in the set that require limit checking, and can check the measured values against the limits. To do so, the limit checker can retrieve the corresponding limit map from the certification map and then retrieve the corresponding limit object from the limit map. This limit object is then used to validate the individual measurement.

At step 16, the limit checker can store a result indicating whether the measured value violates the limits for the test variable to which the measured value corresponds.

At step 17, the limit checker can inform the operator of the result of step 16.

At step 18, the test executive can determine whether there are more tests in the batch. If there are more tests in the batch, then the process continues at step 2. If there are not more tests in the batch, then the process stops.

Data Structure

Embodiments of automated testing system 100 can allow data to be stored in a normalized relational database. More particularly, a set of tables can be constructed for each test. At a minimum, a table can be built to hold all measurements that are made once and only once during the test. This is referred to as the zero-dimensioned table for the test because it has no associated "variable".

If independent variables (input conditions) are changed during the test and measurements are repeated, this set of repeated measurements can be collected into a separate table that can be keyed by the index of the independent variable being changed. At each independent variable value, a new row can be inserted into the table to hold the test variable measurements made at that input condition. Separate tables can be constructed for each test variable.

If measurements are made that are dependent on multiple independent variables, a separate table can be built for each variable combination, with a key column for each variable. In this way the structure can be extended to handle any arbitrary dimension of variables being manipulated during the test process.

The database schema can follow rigid naming rules for tables and columns that can result in a self-descriptive naming convention. By using the self-descriptive nature of this convention, objects can be built that can determine their purposes and relationships at run-time by inspecting the tables and columns as opposed to having to "hard-code" these relationships at design time. This can greatly increase the flexibility of the system and can allow a single intelligent object to replace a myriad of simpler but hard-coded objects.

Table Naming Convention

Data tables can come in two main varieties, "zero-dim" tables and "test variable", or "dependent variable" tables. "Zero-dim" can indicate that there is no "dimensionality" to the data found in the table. Data in zero-dim tables can occur once and only once per test. So, for each test there can be only one record in its zero-dim table. The name of the zero-dim table can be the same as its test_name. Each test can have a single zero-dim table.

For example, "wap_gain" can be the name of the zero-dim table for the wap_gain test and can contain all elements that occur only once per test (gain peak, gain compression, edge channel delta, etc.).

The remaining tables for a test can be termed "dependent variable" tables. These tables can capture information that needs to be linked to a set of test conditions (independent variables) that were manipulated during the test (input power, wavelength, etc.). A separate table can be created for each independent variable and combination of independent variables that were used during the test. Data in these tables can be dependent upon the indicated value of the variable or combination of variables for the specific record.

The dependent variable tables can be named by appending an underscore character and the variable name to the test_name. If multiple variables are in use, an underscore character can separate the variable names. For example, during the wap_gain test nine input power levels could be encountered, along with eight signal wavelengths and nine noise wavelengths. In total, five dependent variable tables could be needed, namely:

"wap_gain_lambda" Contains data dependent only upon the signal wavelength (gain shape factor, source SNR, etc.);

"wap_gain_noise" Contains data dependent only upon the noise wavelength (Noise SNR);

"wap_gain_power" Contains data dependent only upon the input power (average gain, temperature);

"wap_gain_power lambda" Contains data dependent upon each combination of input power and signal wavelength (gain, noise figure); and "wap_gain_power_noise" Contains data dependent upon each combination of input power and noise wavelength (noise power).

During the limit checking process, a set of tables can be identified in which to look for data in need of validation. In order to build the set of tables containing data for specific test, the limit checker can search through all the table names for the presence of the test_name. Thus, continuing with the earlier example, a search for "wap_gain" tables would produce:

wap_gain
wap_gain_lambda
wap_gain_noise
wap_gain_power
wap_gain_power_lambda
wap_gain_power_noise The limit checker can determine the variables in use for the data in each of these tables. To do this the limit checker can simply remove the leading test_name and break the remaining string on the underscore character. Thus, variable names themselves are not allowed to have an embedded underscore character in order to prevent potential ambiguity. Returning to the earlier example, performing this action on the wap_gain tables would result in:

| TABLE: | VARIABLES: |
|---|---|
| wap_gain | None (zero-dim table). |
| wap_gain_lambda | lambda |
| wap_gain_noise | noise |
| wap_gain_power | power |
| wap_gain_power_lambda | power & lambda |
| wap_gain_power_noise | power & noise |

Column Naming Convention

Columns that contain data needing validation can have an associated column of the same name appended by "_fail". This "_fail" column can be of type Boolean and can be set to true if its associated data column failed. Columns without associated "fail" columns can be assumed to be for information purposes only and to not require validation.

For dependent variable tables, each record can have an "index counter" column for each independent variable to indicate the independent variable's index for this record. The count column can be named by appending "_cnt" to the independent variable's name. If there is an associated target value for the independent variable, a column can be provided and named by appending "_setpoint" to the independent variable's name.

For example, the wap_gain_power table can contain data pertinent to each power level and can have the following fields: test_ID power_cnt power_setpoint power_raw_avg_gain avg_gain_fail dut_temp

| 1234 | 1 | -5.56 | -5.51 | 8.25 | False | 23.2 |
| 1234 | 2 | -6.56 | -6.54 | 9.06 | False | 23.1 |
| 1234 | 3 | -7.56 | -7.56 | 9.99 | False | 22.8 |
| 1234 | 4 | -8.56 | -8.55 | 10.86 | True | 23.0 |
| 1234 | 5 | -9.56 | -9.58 | 11.72 | False | 23.1 |
| 1234 | 6 | -10.56 | 10.53 | 12.58 | False | 22.7 |
| 1234 | 7 | -11.56 | -11.57 | 13.45 | False | 23.2 |
| 1234 | 8 | -20.78 | -20.74 | 17.42 | False | 22.9 |
| 1234 | 9 | -30.00 | -30.21 | 22.36 | False | 23.2 |

In this example, "power raw" and "dut temp" can be for information only, while "avg_gain" can require validation, as indicated by the presence of the associated "avg_fail" column. In this example, the average gain measurement at power level #4 as indicated by the "True" value in the "avg_gain_fail" column.

Detailed Functional and Structural Description:

| Key Terms | |
|---|---|
| Certification Table: | Table containing data columns that require validation. |
| Certification Column: | Column in a certification table that contains the actual measurement data needing to be validated. |

Note: the term "collection" refers to the Visual Basic built-in collection data structure. These collections can be "keyed" allowing retrieval of a specific object in the collection by providing the key. Where keys are used (to allow this quicker retrieval) they are indicated, otherwise they can be assumed to be unkeyed.

| Key Data Structures | |
| --- | --- |
| CertTable | Data associated with a certification table. |
| TableName | Name of the table (string). |
| ExpectedRecords | Number of records expected to be found (integer). |
| VariablesString | Underscore delimited set of variable names (string). |
| VariablesCollection | Collection of variable names (collection). |
| CertColumns | Collection of certification columns (collection). |
| TokenLimitMap | Data to provide a mapping between a column name and a set of limits. |
| Name | Column name (string). |
| TableName | Table name (string). |
| LimitType | Limit type character/numeric (string). |
| NumRecordsExpected | Number of records expected to be found (integer). |
| LimitsCollection | Collection of limit objects (collection). |
| VariablesCollection | Collection of table variables (collection). |

Internal Process Sequences

Internally the limit checker can maintain a collection of TokenLimitMaps. LimitChecker.ExtractLimits( ) can be called to construct this collection. This collection can be keyed using each column's name to allow for quicker retrieval during the validation phase.

LimitChecker.ExtractLimits( ) Process Sequence

1. Search through database table names for all tables that contain the current test_name. Build a collection of Cert-Tables using these table names.

2. Remove all table names from this collection that do not contain certification fields (indicated by "_fail").

3. For all remaining CertTables in the collection, determine the variables in use for the table (indicated by underscore delimited list following the test name). Set the VariablesString attribute and build a collection of the variable names for the VariablesCollection attribute.

4. All test variables require a counter field in the test's conditions table. Retrieve this value for each variable in use for the table. The number of expected records will be the product of these counter field values.

5. For each CertTable in the collection, search through its set of columns. Any columns that are for certification have an associated "_fail" field. Put all these columns in a single collection and set the CertColumns attribute.

6. BuildTokenLimitMapo( ) For each certification column in each certification table, determine the distinct variable indexes that are indicated in the limits table. For each distinct set of indexes retrieve a recordset off all limit records. Send this recordset to BuildLimit( ) which determines the type of limits to be applied (string/numeric) and constructs an appropriate limit object. Add this limit object to the map's LimitsCollection.

BuildLimit( ) Process Sequence

The recordset provided to BuildLimit consists of attributes and values. Valid attributes for this sequence include:

min_val, guarded_min_val, max_val, guarded_max_val;

nomtol, guarded_tol, neg_jol, guarded_neg_tol, pos_tol, guarded_pos_tol;

perc, guarded_perc, neg_perc, guarded_neg_perc, ,pos_perc, guarded_pos_perc; and match* (where * is a wildcard).

Embodiments of automated testing system 100 can provide automated guard-banding. Due to measurement variation, "guard-banding" can be used to ensure that certified product does, in fact, pass all specifications as opposed to obtaining a lucky measurement where the error happened to allow it to fall within the acceptable range. Known automated testing systems do not allow for this measurement error, but rather expect the fixed limits to be adjusted to account for measurement error. Typically, the error term for a measurement can vary from test set to test set and from test condition to test condition, so a global change to the limits would not suffice. Instead, with the generic limit checker of automated testing system 100, each of the methods for calculating limits can also include the use of a guard-band that is looked up at run-time.

If guard-banding is indicated, the test executive can obtain the guard-band value in one of several manners. For example, the test executive can retrieve the guard-band value from the zero-dim table for this test. Under this approach, the column name in the zero-dim table must match the current column being validated followed by "_guard_band". Minimum and maximum specification limits can be constricted by this value. Alternatively, the test executive can calculate the minimum and maximum specification limits for this test using the indicated method (explicit, nominal with tolerances, nominal with percentage bounds).

Alternatively, the guard-band can be determined by repeating a set of measurements multiple times to determine accuracy capability. The only limitation is that the guard-band value can not be dependent on any of the independent variables used for the test. Automated testing system 100 is even flexible enough to use guard-banding for some product codes and not others.

At the test script level, measurements can be logged using the appropriate routines, i.e.;

LogNum( value, token, var, index1, var2, index2, . . . )

LogString( value, token, var1, index1, var2, index2 . . . )

At the script level the programmer or script author can call a routine to check limits. Within the test executive, the logging routines ask the limit checker if the token being logged requires validation. If required, the appropriate limit checking routine is called. Thus, if the limit is expressed as a number, the CheckNumLimits( ) routine is called. If the limit is expressed as a string, the CheckStringLimits[00bf][00a8] routine is called. The syntax for these routines are as follows:

LimitChecker.CheckNumLimits( value, token, var, index1, var2, index2, . . . )

LimitChecker.CheckStringLimits( value, token, var, index1, var2, index2, . . . )

The CheckNumLimits( )/CheckStringLimits( [00a8] Process Sequence

1. Retrieve the TokenLimitMap for the token being validated.

2. Build underscore delimited string of variables (var1_var2_. . . )

3. Retrieve the limit object that matches the underscore delimited variable string. First search for an explicit match. If no match found, attempt a regular expression match.

4. Set the logged value of the limit object to the measured value.

5. Instruct the limit object to validate itself.

6. Return the validated limit object to the calling script. After checking limits the script author then has three options:

1. Ignore the returned limit object.
2. Check the result of the limit check. Result is the default property of the limit object allowing it to be inspected directly within an if-then clause:
   IfLimitChecker.CheckNumLmits(23, gain, power, 3)=SPEC_FAILED
   Then
      'Take Action
   End If
3. Set a local limit object to the returned limit object and inspect its various properties as necessary. This is especially useful for optimization algorithms that will make adjustments and repeat measurements until converging on a passing state. The limit object contains the logged value and spec limits so that it can be passed directly into the optimization algorithm which can then inspect the object's properties and make appropriate adjustments based on the magnitude and direction of the error.

Limit objects can come in two types: clsNumericLimit and clsStringLimit:

The properties of clsNumericLimit are as follows:

| Property | Description |
| --- | --- |
| Result | LimitResult enumeration value representing the result of the limit check. Default property for the clsNumericLimit class. |
| LoggedNum | Double representing the measured value. |
| MinSpec | Double representing the minimum specification value used for the check. |
| MaxSpec | Double representing the maximum specification value used for the check. |
| Indexes | Underscore delimited string representing the indexes for the dependent variables for the token represented by this limit object. |
| SubValidate( ) | Performs limit checking against the logged value. Sets the result property accordingly. |

The properties of clsStringLimit are as follows:

| Property | Description |
| --- | --- |
| Result | LimitResult enumeration value representing the result of the limit check. Default property for the clsStringLimit class. |
| LoggedString | String representing the measured value. |
| SpecStrings | Collection of strings against which the logged value should be compared. |
| Indexes | Underscore delimited string representing the indexes for the dependent variables for the token represented by this limit object. |
| SubValidate( ) | Performs limit checking against the logged value (searches for logged string within the SpecStrings collection using regular expression matching). Sets the result property accordingly. |

The results of the limit checking process can be expressed as a LimitResult, which can include the following values:

| Values | Description |
| --- | --- |
| CHECK—NOT—PERFORMED | Indicates that the most recent specification check was for a different data type. For example, following a numeric check the clsStringLimit object's Result property will be set to CHECK—NOT—PERFORMED to indicate that the check was numeric as opposed to a string or regular expression match. |
| SPEC—INFO—ONLY | Value was logged as an information only Token. No limit checking was attempted for this measurement. |
| SPEC—PASSED | Value was logged as a certification data point. Limit checking was performed and the measurement passed. |
| SPEC—FAILED | Value was logged as a certification data point. Limit checking was performed and the measurement failed. |

Advantages

Embodiments of automated testing system 100 can provide a set of intelligent business objects that can (through run-time inspection of the tables and column names):

Dynamically determine which measurements of a test need to be validated.

Dynamically calculate limits to be applied.

Validate measurements.

Return an object that indicates the value measured, the validation result and the specification limits applied.

Thus, embodiments of automated testing system 100 can provide advantages over the known automated testing systems. For example, having a single centralized limit checker can relieve test script authors of the responsibility to build mini-limit checkers for each of their tests. Also, due to centralization, all limit checking can use a common standardized approach. Any modifications can be changed in one location and utilized globally throughout the system.

Embodiments of automated testing system 100 can provide a clear separation of the measurement process from the validation process. For example, test scripts can be only responsible for making test measurements. Data validation can occur as a separate distinct step. Thus if limits change, product is not necessarily required to be retested to determine if it meets the new limits. Instead, the generic limit checker of automated testing system 100 can simply be directed to re-execute the data validation process using a different set of limits. This can also provide a simple mechanism for "binning" product. Under the binning approach, different limit sets can be provided for each bin, and the generic limit checker can be directed to validate a set of raw measurements against the limits for each bin and route the product to the first bin for which all specifications are met.

Embodiments of automated testing system 100 can allow selection of measurements requiring validation to be delayed until run-time. Previously, the identity of each measurement that needed validation was hard-coded at the test script level. If, after formal release of the code, it were decided that a measurement that was not previously validated suddenly needed validation, the original source code would have to be modified, rebuilt and re-released. Now, the generic limit checker of automated testing system 100 can inspect the database at run-time to determine which fields need validation. Simply adding a new appropriately named field to the database can result in the measurement getting checked against limits. (This new check could even be performed after the fact due to the separation of the measurement and validation processes, thereby eliminating the need to recall and retest product that was not originally checked against the new limit).

Embodiments of automated testing system 100 can provide a method for calculating limits delayed until run-time. Previously the hard-coded limit checkers retrieved specific token values and calculated acceptable ranges. Multiple schemes were used within the limits files. The specific scheme was hard-coded within the local limit checker. If the test script author assumed a balanced +/−tolerance, and later it was determined that a different value was needed for the positive and negative terms, the original source code would need to be reworked, rebuilt and re-released. With the generic limit checker of automated testing system 100, the method for calculating the acceptable range can be deferred until the tables are inspected at run-time. Changes in choice of calculation scheme can be made without affecting compiled code. The system is even flexible enough to use different schemes for different product codes.

Embodiments of automated testing system 100 can provide the capability to work in N-dimensional space. Previously the hard-coded limit checking routines were intelligent enough to resolve single dimensioned variables in use during the test. No attempt was made to handle multi-dimensional data. However, the generic limit checker of automated testing system 100 can handle any arbitrary number of variable dimensions.

Moreover, embodiments of automated testing system 100 can use regular expressions to reduce the work needed to maintain limit tables. Previously, for any variables in use during a test, limits had to be provided for each and every value of that variable. If measurements were made at 32 wavelengths and we wanted to check only the endpoints (wavelengths #1 and #32), limits had to be provided for all 32 wavelengths (resulting in thirty extra lines in the file to be maintained by the test engineer). Now however, automated testing system 100 can provide regular expression matching, wherein explicit limits can be provided for wavelengths #1 and #32 and a single separate limit can be applied to all remaining wavelengths (requiring only three rows as opposed to thirty-two). Also, due to each product code being mapped to a separate set of limits, which values are checked against specific limits and which are covered by a regular expression can now be changed from product code to product code.

Embodiments of automated testing system 100 can provide automated guard-banding. Due to measurement variation, "guard-banding" can be used to ensure that certified product does, in fact, pass all specifications as opposed to getting a lucky measurement where the error happened to allow it to fall within the acceptable range.

Known automated testing systems do not allow for this measurement error, but rather expect the fixed limits to be adjusted to account for measurement error. Typically, the error term for a measurement can vary from test set to test set and from test condition to test condition, so a global change to the limits would not suffice. Instead, with the generic limit checker of automated testing system 100, each of the methods for calculating limits can also include the use of a guard-band that is looked up at run-time.

If guard-banding is indicated, the generic limit checker can retrieve the guard-band value from the "zero-dim" table for the test and can automatically restrict the final acceptance range by the indicated amount. This requires the test script to determine and log the guard-band to be utilized. This could be as simple as looking it up in a fixed table for the test set or as complex as repeating a set of measurements multiple times to determine accuracy capability. The only limitation is that the guard-band value can not be dependent on any of the independent variables used for the test. Automated testing system 100 is even flexible enough to use guard-banding for some product codes and not others.

Embodiments of automated testing system 100 can work with string or numeric data. Previously, all limit checking was performed numerically. The generic limit checker extends this process to include string validation. If string type limit checking is indicated, a collection of valid strings is built and associated with the column to be validated. The measured value is stored as a string and compared to the members of the valid string list. If a match is found, the value "passes", otherwise it fails. Regular expression expansion is used to allow wildcards within the strings to be compared. A detailed description of an embodiment of the invention is presented below.

Detailed Description of a Test Executive

Overview

What follows more particularly describes an embodiment of an architecture for the test executive. The following also identifies and describes major subsystems of the test executive, and how they interact. The functionality encapsulated by this architecture can encompass the following:

User administration. Maintenance of an account system separate and distinct from the login account system.

Menu interpreter. Presentation of menus to the user. Processing of user's selections.

Test suite bootstrap. System initialization and spawning of global processes and OS services.

Batch processing. Test sequencing and flexible recovery in the event of test failure.

Process control and monitoring. Monitoring of executing tests. Ability to terminate tests programmatically.

Device loading. Upon selection of a new device under test, previous stage test information can be retrieved from the database and, based on the device's code, local specification files containing test conditions and limits for the appropriate tests can be extracted and built.

SYSTEM CRITERIA

User administration. The test executive can maintain a set of user accounts and associated privilege levels separate and distinct from the Windows-NT login account system. The test executive can provide a GUI for addition, deletion and modification of user accounts, changing of user passwords and assignment of privilege levels. If we relied solely on the operating system for user ID's, we would have to reboot the system to log-in as a different user (i.e. tester with low privilege level is running test set and engineer needs to access utilities the tester does not have access to). With a secondary account system, an engineer could "change users" within the test manager in order to access the privileged areas and then restore the original user when completed with the privileged operation.

The test executive can maintain a set of user accounts. An account can consist of login name (1 to 15 characters), password (5 to 15 characters), full name (up to 50 characters), and privilege level (0 to 100).

The test executive can provide GUI for addition, deletion and modification of user accounts. The test executive can provide the ability to "change users" without requiring the user to exit the system and re-login. After a successful user switch, privilege levels can be adjusted to match the new user's access level.

Menu interpreter. Presentation of menus to the user. Processing of user's selections. While the user can be presented with all available menu choices, they should only be able to execute those for which they have a sufficient privilege level. There can be some visual indicator as to which menu choices are "enabled".

The menu interpreter can be able to determine the privilege level associated with each menu choice and compare it with the privilege level of the current user. The user can be prevented from being able to select actions for which they do not have sufficient privilege.

The GUI for the menuing system can provide a visual indication as to which menu choices are active (user has sufficient privilege) and which selections are disabled (user does not have sufficient privilege).

Test suite bootstrap. The test executive can gain control of the system at the close of the system's autostart script. After authenticated user login, the test executive can commission any servant processes or operating system services needed by the test scripts. Currently these can include:

Environmental chamber controlling process.
System event logger.
Inter-process message router/handler.
Status monitor and report generator.

The test executive can provide a mechanism whereby a set of executables can be started during system bootstrap. Any necessary command line switches for the executables can be provided. The set of executables can be changed without requiring recompilation of the mechanism.

Batch processing. The test executive can sequence through a battery of tests and take appropriate action based on whether tests pass or fail. If a test aborts, the user can be given the opportunity to re-run the test. If some tests fail, the batch may continue while, for other tests, failure may cause the batch to abort. Multiple batches can be created allowing for non-standard or experimental sequences to be run by direction of the test engineer.

The user can be provided with the opportunity to re-execute any aborted test.

If the user declines to retry the test and the step's "continue_batch_on_failure" tag is set, the user can be queried as to whether or not to continue with the batch.

If a test fails and the maximum number of retries indicated by the step's "retry_on_failure" tag have not been reached, the user can be given the opportunity to retry the test. If the user declines to retry the test and the step's "continue_batch_on_failure" tag is set, the user can be queried as to whether or not to continue with the batch. If the maximum number of retries have already been attempted, or if the number of retries is zero, the test can be logged as failed and no attempt to retry can be offered.

If a test fails and the step's "continue_batch_on_failure" tag is set, the batch can continue. If the tag is not set, the batch can abort. If a test aborts and there are concurrent tests still running, if the step's "abort_on_sister_abort" tag is set, the concurrent tests can be aborted. If the tag is not set, the concurrent tests can be allowed to run to completion. If a step includes test dependencies, the test sequencer can ensure that the previously specified tests have been completed and have passed. Upon completion of a batch step, the sequencer can inspect the "next_batch step" tag. If the tag is set to "next step" the normal following batch step can be executed. If the tag is set to another batch step, the batch can jump back to the indicated step and proceed normally from that point.

Device loading. The test executive can allow the user to select a new device for testing. Upon selection the test executive can fetch previous stage test information from the database and, based on the device's code, can extract and build local tables for test conditions and test limits. The test executive can provide a mechanism whereby previous stage test information for the current device is extracted from the database during the load process. The test executive can provide a mechanism whereby local test conditions and limits are associated with the selected device under test.

Separation of test conditions and test limits. Test conditions can dictate the instrument configuration at the time the measurements are taken. As such these are inseparable from the raw measurement data. The test limits however, do not have any impact on the measurement process. The next generation executive can keep these two entities separated to reflect this difference and can allow for a "software churn mode" whereby a set of raw measurements can be validated against an arbitrary set of limits. The test executive can have a mechanism to separate test conditions from test limits.

Decoupling of measurement and measurement validation. Previously a "spec" file was maintained that included both test conditions (inputs to the test scripts) and limits (values against which test script measurements were verified). The test executive of the current invention can require the test conditions and test limits to be maintained separately. The test conditions represent the state of the test set as the measurements were being made and, as such, are inseparable from the raw measurement data. The test limits however, have no effect on the measurement process and can be therefore subject to manipulation in software after the fact.

In order to be able to pipe a set of raw test measurements through an arbitrary set of test limits, a "limit checking process" can be introduced. This process can be run independently allowing a set of raw measurement data to be verified against any arbitrary set of spec limits. It can be advantageous to have this limit checking process handle all limit checking as opposed to the known scheme where a test script validates its own measurements.

Local test set database. The test suite can utilize a fully functional (SQL) database. It can remain table driven to avoid the pitfalls of "hard-coding" but now the tables will be proper database tables as opposed to ASCII flats. The test executive can use a local MS-Access database for non-volatile storage. For centralized (back-end) storage and communication, a SQL-Server database with table structures that mimic those of the local test set can be provided.

User selection tracking. In the past, it has proven difficult to repeat a user's set of selections that produced a failure. Also, cases have been encountered where the user claims that there is a software error, when in fact, they simply made an incorrect menu selection. To prevent these problems, all user interaction with the system can be logged to the system event logger. All user interaction with the system can be logged to the central event logger. The logger can consist of several severity levels. A severity level can be allocated for user events.

Structured exception handling. When an error condition is recognized in the known test suite, execution is halted and a "help" screen is displayed which contains an error message. Unfortunately, if the exception is recognized in a lower level procedure deep down the call stack, there may not be enough information to determine the cause of the problem.

Exception handling for the test suite disclosed herein can be constructed to prevent this problem. When an error condition is recognized, an error will be thrown and caught by the routine's local error handler. The local handler will log the name of the current function and description of the error and then it will re-throw the error up the call chain to the calling routine. The error will continue to be caught, logged and re-thrown up the call chain until it reaches either the test script level or the highest layer of the test executive.

The highest layer routine may decide to handle the error and recover, or it may halt execution and display an alarm screen. By using this scheme the event logger serves as a call stack tracer that allows the software engineer to view the sequence of events and routine calls that lead to the error condition. All routines can have local error handlers. All local error handlers can either a) handle the error, or b) log the name of the current function, error number and error description and then re-raise the error to the calling routine. The highest layer of the test executive can either handle the error or halt execution and display an alarm screen indicating the current routine, the error number and a description of the error.

FUNCTIONAL AND DATA DESCRIPTION

Figure 3:
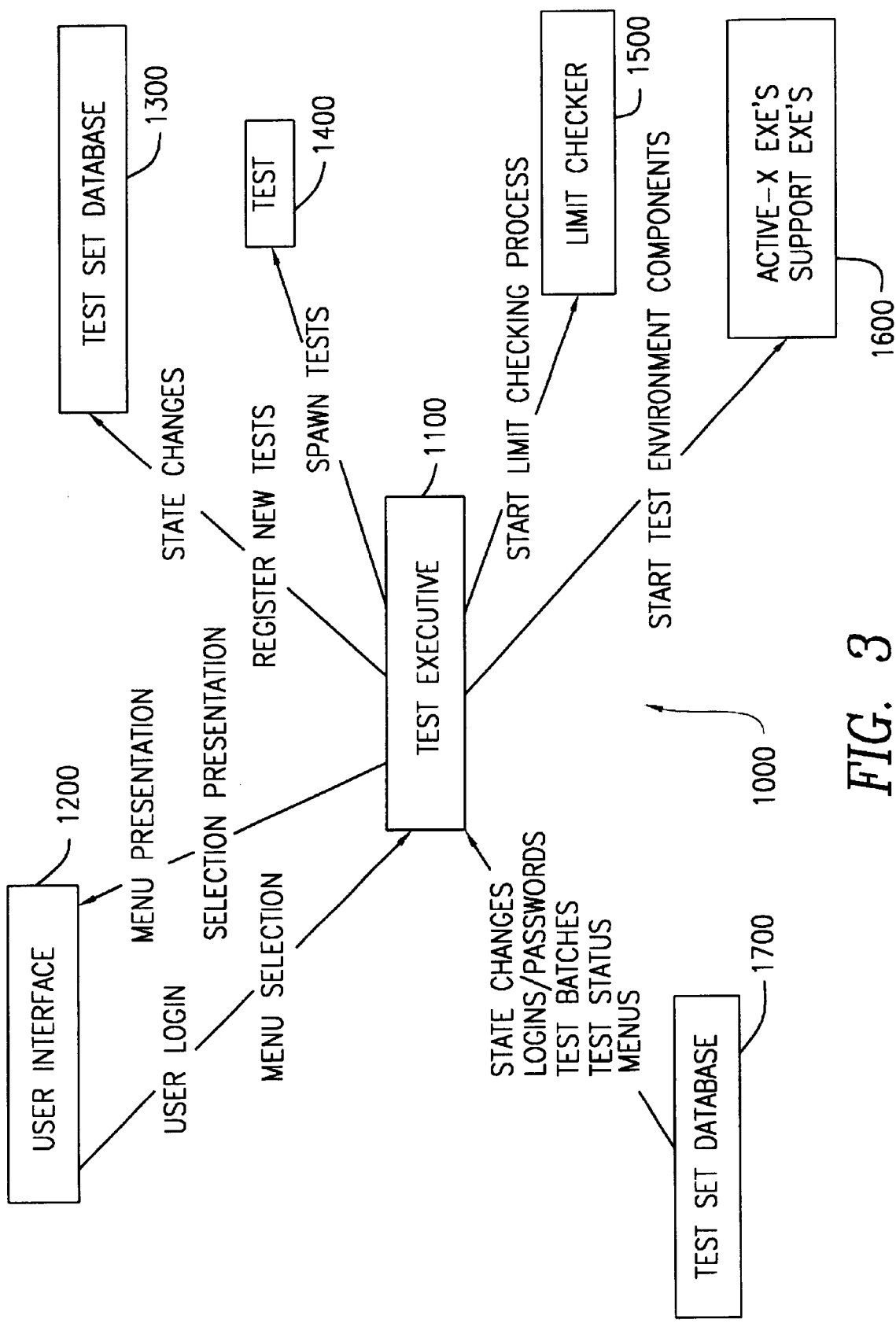
FIG. 3 is a block diagram of an automated test system of the present invention.

System architecture: FIG. 3 is a block diagram of testing system 1000 (also referred to as "the test suite"). Information flow arrows radiating from and pointing to test executive 1100 indicate the type and direction of information within system 1000.

User interface 1200 can act as the principal man-machine interface for system 1000. It can present system login and password boxes to the user during system bootstrap. It can provide a visual indication of major system state variables (device under test, test set mode, etc.). In addition, it can provide the menuing system to allow the user to migrate through the various command screens to modify the test set configuration and control the flow of tests.

Test executive 1100 can utilize test set database 1300 to hold state variables in non-volatile storage so the test state can be restored in the event of a power cycle. In addition, as each test is invoked, it can be "registered" with test set database 1300 so its progress can be tracked by other elements of test executive 1100 and the test suite as a whole.

Test executive 1100 can be responsible for driving the test batch process whereby a sequence of tests 1400 can be executed in a specified order with the specified command line switches. The test executive can create a new command shell, parse the command line for the test, and spawn the new process in which the test executes.

Test executive 1100 can be responsible for recognizing the termination of a running test (both normal termination and test aborts). Upon completion, the test's results can be validated against the appropriate specification limits. Test executive 1100 can determine the location of the specification table and the version of limits to be applied, and can start limit checker 1500.

The test suite is designed as a set of interacting processes. During system bootstrap, test executive 1100 is responsible for parsing the command lines and spawning support components 1600 (Active-X EXE's and support EXE's). Examples of these include the system event logger and the report generator.

Test executive 1100 extracts its information from test set database 1700. During bootstrap the previous test set state is recovered through inspection of state variables. System logins and password are maintained in the "authorized" table. The configuration of the various test batches, their constituent tests and associated command line switches are all maintained in the local database. All menu selections and action codes to be taken in response to their selection are kept in local database tables. In order to determine the outcome of executing tests, test executive 1100 queries the database for test status updates.

Database Interface Layer—The test suite is constructed utilizing a layered architecture. A database interface object provides a layer of abstraction between the higher processes (which includes the test executive and the test scripts) and the physical database. The interface consists of a small number of straightforward functions that the layer interprets in a context sensitive fashion based on "who" is requesting the transaction. This relieves the test executive and script authors from needing to be intimately aware of the inner workings of the database. It also allows the database designers and implementors to make sweeping changes to the database as the system grows provided the documented interface contracts are adhered to. This layer acts as a disconnect which allows the test executive and script authors to concentrate on their specialities (test instrumentation and flow control) while allowing the database professionals to pursue a fully normalized database solution without having to worry about explaining its subtleties to "non-database" team members. In general, the test executive will utilize this database interface layer for all interaction with the database as opposed to parsing and executing its own queries and SQL commands.

SUBSYSTEM DESCRIPTION

Bootstrap Subsystem:

Bootstrap Module—Can query the database for the path, executable name, and command line switches for test suite Active-X and standard executables. The module can perform a system shell call to invoke each as separate process. The bootstrap module can use the database interface support layer as opposed to directly querying the database to prevent higher level processes from dictating database implementation due to hardcoding of queries.

Menu Interpreter Subsystem:

Menu Form—Can present the user with summary status fields and a varying menu from which to choose actions. The status fields can include test set name, test set mode, device code, device serial number, current user and currently selected batch. The user can be able to make a selection via a mouse click or through numeric entry. Any menu choices for which the user does not have sufficient privilege can be indicated visually and in the event they are selected, can result in no action. No further indication is required in the event a non-privileged action is attempted. Title bar of the form can include the major/minor revision as well as the build number. The background of the display can change color depending on the operational mode of the test set.

Dispatch Module—Upon selecting a menu choice, this module will determine the type of action indicated by the user and perform one of the following three action types:

MENU—Clear the current menu and present a new menu to the user.

PROCEDURE—Transfer control to an internal procedure.

EXEC—Start an executable as a separate running process.

The menus can change back and forth very quickly in response to the user. The menu interpreter can use the database interface support layer as opposed to directly querying the database to prevent higher level processes from dictating database implementation due to hardcoding of queries.

Security Subsystem:

Login Form—The user can be presented with a login screen. A username text box can echo the characters entered. A password text box can enter a mask character (*) for each entry.

User Administration Form—The user can be presented with a data bound grid that displays all user logins, full names and privilege levels. Based upon the current user's privilege level this form can be used to add, modify and delete users.

Encryption module—Basic encryption techniques can be used with the intent to prevent a naive user from gaining unauthorized access to restricted menu selections. The encryption can only be performed "one-way", specifically, the password can be stored in encrypted form; the password entered during login can be encrypted and compared. No decryption mechanism is needed and, in fact, can NOT be developed.

Authentication module—This module can drive the verification process, loading the GUI form and responding to user input. If the user fails to authenticate, an unlimited number of retries can be permitted. Once authenticated, the module can transfer control to the Bootstrap system. The module can publish the current user's name and privilege level via object properties. This module can also drive the user administration process by loading the form and disabling the command buttons for which the user does not have sufficient privilege level.

Advantages—The security subsystem can use the database interface support layer as opposed to directly querying the database to prevent higher level processes from dictating database implementation due to hardcoding of queries.

Test Sequence Control Subsystem:

Test Set Module—This module can represent the interface layer to the rest of the test executive and can publish any routines that need to be called by either the bootstrapper or the menu-interpreter. This module can also maintain internal state variables to track test set mode, device code and device serial number. During batch selection, this module can query the database for a list of available batches and present them to the user. After selection, the module can inform the batch controller of the selected batch. The test set module can be responsible for recovering the state of the test set following a power cycle.

Batch Control Module—This module can be responsible for sequencing through a batch of tests. It can contain all flow control logic including actions to be taken in the event of test abortion or failure. Upon completion of a running test this module can initiate the limit checking process.

Test Control Module—This module can be responsible for the configuration, execution and monitoring of individual tests. Test configuration and actions to be taken in the event of failure can be loaded from the test set database. The current test's state can be published so it can be queried by the batch controller.

Device Management Module—This module can allow a new device under test to be selected by the user. This module can spawn the device code specific loading process which can in turn retrieve required device data from the database and create the device's database table for token storage.

Performance—The test sequence control subsystem can poll the database for the status of executing tests. The polling interval can represent the maximum time that may transpire between a test completing and the test executive "realizing" that the test has completed. The database can be under heavy use by the test scripts during the executing tests so care can be exercised to ensure excessive status polling does not overload the database services. An interval on the order of five seconds can prevent the database from getting overloaded and can provide a reasonable response to the completion of a test.

Advantages—The test sequence control subsystem can use the database interface support layer as opposed to directly querying the database to prevent higher level processes from dictating database implementation due to hardcoding of queries.

Implementation Environment: The system can be constructed using Windows-95 systems for development. Windows-NT Workstation systems (version 4.0 with service pack three) can be used as actual test set controllers. MS-Access 97 can be used to construct the local test set database. The programming language can be limited to Visual Basic (version 5.0 with service pack three). The team can exploit any and all features of VB 5.0 that they desire. Use of DLL's can be limited to those that came with the VB or MS-Access, the Win32 API and any Active-X DLL's the team constructed using VB.

Alternatives: If possible, a "one language" system can be used versus a mixed language solution. However, a mixed language solution using VB for the front-end work and lower level DLL's consisting of compiled C routines can be attempted. Development can be in the UNIX environment.

A flexible database architecture and associated interface layer can be developed that can allow the test suite to be built upon a fixed-schema database while not requiring the test script authors to become overburdened with database details (i.e., parsing of SQL commands/queries).

The low-level requirements of instrumentation control over the GP-IB bus can be handled within the bounds of the Visual Basic programming language.

Findings: A prototype embodiment of the system was constructed. A power supply and multimeter were used to measure current flow through a resistor. The test was executed under different conditions and was repeated 1000 times for repeatability assessments. Although a simple set-up, Windows-NT easily met the stability requirements.

Visual Basic 5.0 coupled with Visual SourceSafe for code control and NuMega's CodeReview for a "Lint" like code inspection utility was considered sufficient for controlled software development.

A table and column naming convention was introduced that allowed the team to construct a generic database interface class that can act as a disconnect between the database and the script authors. This convention and interface class provided a mechanism whereby a fixed schema database could be used while the script authors could continue coding in the fashion they were accustomed to.

Reliable instrument control DLL's can be constructed using native Visual Basic code constructs. Windows-NT OS services were sufficient to mimic the UNIX system calls.

SOFTWARE DESIGN

System Objectives: The optical/electrical automated test suite can be used in a variety of testing configurations and can be capable of testing any product. Architecturally the test suite can be split into multiple layers. The test executive can reside at the highest layer and can act as the principal user interface to the remainder of the test suite. This process can govern all activity on the test set and can be responsible for system login, initialization of support processes, user request dispatching, and test sequencing/execution control. At the lower architectural layers, test sets can differ based upon instruments present and products slated for test. However at the higher levels, the processes can be constructed in a more generic fashion that can be customized dynamically at run-time through inspection of the local test set database. As such, there can be a single version of the test executive that is capable of governing any and all testing stations.

Hardware Interfaces: The test sets can primarily utilize the IEEE 488.2 interface bus (GP-IB) to communicate with test instrumentation. RS-232 interfaces can also be utilized. Due to the test executive residing at the highest level of the system, it can find itself relatively insulated from the hardware.

Software Interfaces:

Component Packaging: Within the Visual Basic language, support objects can be packaged in several configurations. Package types used by the test suite are defined as follows:

Active-X EXE—This package type can represent code components that can execute in their own process space as opposed to routines that are dynamically linked in to the calling procedure. They generally can take on a two-tiered structure, a background process (of which only a single instance is ever running on the system regardless of how many processes are using it) and a conduit class to allow communication between the calling process (client) and the background process (server). Although only one copy of the background process is ever running, each calling routine can get its own conduit object with which to communicate with the process. These packages can be used for "daemon" type services that may be needed by many different objects throughout the system (i.e central event logger, environmental chamber controller, etc.).

Active-X DLL w/ Global Instancing)—This package type can consist of a collection of Visual Basic classes that can be configured for global use. The author does not need to instantiate a global use object. A single instance of the object can be always available (similar to the built-in objects of Visual Basic). In addition, their methods do not need to be scoped to the class but can be directly called (i.e. instead of StringLibrary.ExtractToken( ) you can simply call ExtractToken( ) with no reference to the StringLibrary Global Object). This can allow global use objects to act as extensions to the programming language.

Active-X DLL w/ Standard Instancing—This package type can consist of standard classes that are packaged into a DLL to allow them to be shared by multiple processes. These classes can be instantiated and execute in the same process as the instantiating routine. These packages can serve as a ready library of classes for use at any level of the system.

Support Components: The test executive can depend on several key support components that are briefly described below.

StringLib (Active-X DLL w/ Global Instancing). Extension of the built-in Visual Basic string processing routines.

Logger (Active-X EXE). Central event logger. This process can be commissioned by the test executive during the bootstrap process. All processes and most individual class objects can obtain their own hook into the logger to record trace, user, warning, fault and fatal-error events.

Scribe (Active-X DLL w/ Standard Instancing). This scheme is a database interface object that can be used by all processes wishing to read or write to the database. This scheme can abstract the specific structure of the database and can parse queries dynamically based on the identification of the calling routine. This scheme can allow a small number of access functions to access a broad spectrum of tables.

CmdLine (Active-X DLL w/ Standard Instancing). This scheme is a command line switch processor. This scheme can extract switches from the command line and publish them as read-only properties. This scheme can encapsulate interpretation of command line switches.

Human Interfaces: Users (testers and/or operators) can interface with the system through the test executive's GUI. As with standard GUI design directives, users can navigate either by using the mouse or the keyboard.

Database Interface: Although the Scribe object can serve to insulate the code authors from the detailed structure of the database, it can be beneficial for them to understand its basic structure. Through the use of a table and column naming scheme the Scribe object can dynamically parse queries based on the identification of the calling routine. Code authors can understand this naming convention in detail and employ it in order to retrieve tokens and log measurement data.

The database interface object (the Scribe class) can insulate the code authors from the database structure. One other advantage is that this class can act as a disconnect between the executing code and the physical database. This can allow the database designers a great deal of flexibility and the opportunity for future redesign. Every element can use the database interface object (Scribe) for all database access.

ARCHITECTURE IMPLEMENTATION

The test executive can be divided into four subsystems.

Subsystem Lifetime: The test executive can be divided into four subsystems. These include the Bootstrap subsystem for system initialization, the Menu Interpreter subsystem for user interface management and processing of user requests, the Security subsystem to allow controlled access to the various functions of the test executive and the Test Sequencing subsystem to control and monitor the flow of the automated tests. The Bootstrap subsystem can be instantiated at the start of the program and then destroyed following successful completion of the bootstrap process. The remaining three subsystems can have permanent lifetimes and can be available until the test executive is shut down.

Subsystem Packages: Each subsystem can consist of a top level class which can contain the public interface to the package and a set of private classes and visual forms that can be instantiated and controlled by this top level class. Visibility into each subsystem package can be limited to the public interface of its top level class.

Global Object References: To allow all objects to use a common instance of the database interface object for database input and output, a global object reference to the Scribe class can be provided. To allow the permanent subsystems to communicate easily, global object references can be provided that point to the principal object (top level class) for each subsystem. These global references can be initialized by the Main( [00a8] at the start of the program immediately following initialization of the subsystem's principal objects. These principal objects can include:

clsSecurity (security subsystem).

clsMenuInt (menu interpreter subsystem).

clsTestSet (test sequence subsystem).

Test Executive Main( ): At the highest level of the test executive architecture can lie the Main( ) routine that can be called by the OS at the start of the program. This routine can instantiate the principal objects for each subsystem, set the global object references to point to the top level classes, and perform system initialization. Following initialization, the main menu can be launched. From this point onward the system can be event driven with events handled by the top level classes. If an error is raised and is unable to be handled by a lower level routine, it can be caught by the Main( )'s local error handler. In this event, Main( ) can halt execution and launch a critical message box to the user indicating the error number, the source of the error, and the error description.

Exception Handling: All routines can be supplied with local error handlers. When an error condition is recognized, an error can be thrown and caught by this local error handler. The handler can have the option of either recovering locally and resuming execution or logging the event and re-raising the error to the calling routine. The log entry can include the name of the current function and a description of the error.

SUBSYSTEM DESIGN

Definitions:

Scribe: This subsystem can provide a database interface object that can be used for database input and output. This subsystem can also provide a generic interface to the local MS-Access test set database. This subsystem can relieve the test script author of the need to locate tables and parse SQL-statements.

Token: Token-value pairs can be stored in the database. Different elements of the test suite can be responsible for setting the values for specific tokens to provided information for other test suite elements. Also token-value pairs can provide a mechanism for non-volatile storage so the test suite's state can be recovered after a power cycle.

Property: This is a Visual Basic term for routines that are often referred to as "getter" and "setter" methods by other object-oriented programming languages.

Properties can come in two flavors, property get and property let. The "get" flavor can return a value. The "let" flavor can take a formal argument of the same data type as that returned by the "get" flavor. A "get" with no accompanying "let" can provide a "read-only" mechanism. In the documentation below, properties will be identified as read-only or read-write as opposed to listing them as get and or let.

Sub: This is a routine with no return value.

Function: This is a routine that returns a value. Data type of the return value can be indicated by the "As" clause following the formal argument list (i.e. "Function SquareRoot( number As Double ) As Double" returns a double).

Methodless Classes: Within Visual Basic, user defined types (structs) cannot be returned from functions and cannot be used with Visual Basic's built-in collection objects. Classes on the other hand can be used with collections and can be used as return types. To take advantage of the additional functionality of classes, throughout the test suite we can define classes which contain public data but no methods. These are essentially user defined types but because they are declared as classes they can be used in collections and can be returned from functions. These are referred to in the system documentation as "methodless classes".

Test Executive Main( ) Narrative: The Main( [00a8] routine can called by the OS to start the program. This routine can instantiate the permanent subsystems' principal objects (clsSecurity, cIsMenuInt and clsTestSet) and can set the global references to point at the newly created objects.

The security subsystem can be called upon to login the user. Following the authentication process, the bootstrap subsystem can be called to launch any needed support processes. Following the bootstrap process, the test sequencing subsystem can be called upon to restore the test set's previous state. After state restoration, the menu interpreter can be called upon to display the main menu. From this point onwards, the program can be event driven, responding to menu selections.

Security Subsystem: The security package can consist of two classes and two forms. clsSecurity can be the principal class and can contain the public interface for use by the rest of the test executive. The clsCipher class can be private to the security package and can be used by clsSecurity for encryption. frmPassword can be used to enter and verify passwords. frmUserList can be used by clsSecurity for user administration.

cisSecurity Narrative and Protocol Description: Can contain routines for user login and authentication. Current user's login and privilege level can be published as read-only properties. User administration methods can be provided that launch frmUserList and enable/disable command buttons based upon the current user's privilege level. Protocol description (enumerations, properties and methods):

LoginResult Enumeration: LOGIN_SUCCESFUL, LOGIN_FAILED & LOGIN_ABORT. This enumeration can be returned by the login process to indicate the outcome of authentication.

CurPrivilegeLevel (Read Only Property)—Can return an integer between 0 and 100 indicating the user's privilege level.

CurUser (Read Only Property)—Can return a string indicating the login of the current user.

Function Login( ) As LoginResult—Can launch a standard input box to get the user's login. If user presses "Cancel" LOGIN_ABORT will be returned. Can use Scribe to confirm that the entered name can be recognized as a valid user (entry in the "authorized" table). Can launch frmPassword to retrieve the password. Can use clsCipher to encrypt the provided password. Can call the Scribe to retrieve the password associated with the user login and compares the two. If they match, LOGIN_SUCCESFUL can be returned, otherwise LOGIN_FAILED can be returned. If successful, private data (accessible via read-only properties) for the current user and privilege level can be updated, and the Scribe can be directed to update the value of the "current_user" token in the "test_set_state" table.

Sub AddUser( ) —Can use standard input boxes to get the new user's login, full name and privilege level. Can launch frmPassword to get the new user's password. Can call Scribe to enter the new user's configuration into the "authorized" table. If the new user already exists, a message box alerts the user that the operation cannot be completed. If the user enters data outside of the prescribed ranges (see database usage section 4.3.5), the entry will be refused and the user will be prompted again for the field.

Sub DeleteUser( ) —Can launch frmUserList with the "Delete User" command button enabled. When the command button is pressed a message box can be launched to confirm the request to delete the selected user. If confirmed, Scribe can be directed to delete that user from the "authorized" table.

Sub ChangePrivilegeLevel( ) —Can launch frmUserList with the "Change Privilege Level" command button enabled. When the command button is pressed, a standard input box can be launched to get the new privilege level for the selected user. Scribe can be directed to update the user's record in the "authorized" table.

Sub ChangePassword( ) —Can launch frmUserList with the "Change Password" command button enabled. When the command button is pressed, launches frmPassword to get the current password for the selected user. Can use clsCipher to encrypt the password and can call Scribe to retrieve the password from the "authorized" table. If they do not match a message can be launched informing the user and the operation aborts. If they do match, frmPassword can be launched again to enter the new password. Passwords can be between five and fifty characters in length. The password can be entered twice. If the two entries do not match, a message box can be launched to inform the user and the operation aborts. If the two entries match, Scribe can be directed to update the selected user's record in the "authorized" table.

Sub ListUsers( ) —Can launch frmUserList with no command buttons enabled. The user can browse the user listing.

cisCipher Narrative and Protocol Description: clsCipher can be private to the Security package. A clsCipher object can be instantiated by clsSecurity and can be used for encryption of passwords. clsCipher houses a basic one-way encryption algorithm. rotocol description (public properties and methods):

KeyString ( Write-only property ): Can be used to set the encryption key.

Function Encrypt( source As String ) As String: Can encrypt the provided string using the encryption key as the seed into the algorithm. Can return the encrypted string.

frmPassword Description: Can contain two text boxes configured with "*" as the echo character. Can be launched with only one box visible (for password confirmation) or with both boxes visible (for password creation). frmUserList Description: Can contain a data bound grid that uses the "authorized" table as a record source. The password column is not shown in the grid. Can contain command buttons for record deletion and changing of privilege levels and passwords. These buttons can all be disabled as the default setting. If they are to be used, they can be enabled by the routine that launches the form prior to making the form visible. Also can contain an exit command button which will destroy the form.

Database Usage: The security subsystem can use the authorized table to inspect and set user logins, names, passwords and privilege levels. The table can consist of the following fields login (1–15 characters), password (5–15 characters), full name (50 characters), privilege level (integer between 0 and 100). The current_user token in the test_set_state table can be updated upon successful login.

Bootstrap Subsystem:

Bootstrap Narrative and Protocol Description: The bootstrap routine can be called by the main( ) immediately following the login process. A list of executables that need to be started can be maintained in the database. This routine can direct the Scribe (database interface object) to retrieve the path, executable name and command line arguments for each executable that can be started at bootstrap. The Scribe can return a collection of strings with each string representing the command line to be issued for each bootstrap executable. The bootstrap routine can loop through this collection and utilizing Visual Basic's "Shell" function, can start each bootstrap executable. Protocol Description:

Sub Bootstrap( ) —Can retrieve list of executables and issues command lines.

Database Usage: Can access the bootstrap table to retrieve paths, executable names, and command line arguments for each bootstrap executable. Menu Interpreter Subsystem: The menu interpreter package can consist of two classes, one form and one module. clsMenuInt can be the principal class of this package and can contain the public interface for use by the rest of the test executive. clsMenu can be a methodless class which maintains information regarding a single menu choice and can be private to the menu package. frmMenu can be the main form that presents test state information and menus to the user. The ProcedureMap module can be a standard code module that contains a dispatch routine that associates a keyword (from a menu selection) with an action to be taken.

Menu System Flow: The menus can be defined in the database's "menus" table. Each record in the table can correspond to a menu selection. The menus can be completely customizable by the test engineers through the database. To aid in their understanding of the menuing system we will describe the internal (private) routines that can be involved in menu processing operations. After the Main( ) has completed initialization and test set state restoration, it can call clsMenuInt's StartMainMenu sub. The following private routines can be then called to present the menu:

Sub GetMenu( name As String): Can use Scribe to retrieve all menu records from the database that correspond to the indicated menu name. Can loop through the retrieved recordset extracting the menu information for each record. Can call AddMenuChoice( ) with each record's configuration.

Sub AddMenuChoice( text As String, action_type As String, priv_level As Integer, action As String, path as String ): See clsMenu's description (below) for definition of the formal arguments. If the record's action_type can be "TITLE" then AddMenuChoice can set a private string to match the title, otherwise AddMenuChoice can create a new clsMenu object and sets its attributes to match the formal arguments. This new clsMenu object can be then added to the private MenuChoice collection. This collection can hold a clsMenu object for each choice in the currently displayed menu.

Sub RefreshMenu( ): Can set the title of the menu based on the private string set by AddMenuChoice( ). Can loop through the private MenuChoice collection. For each clsMenu object in the collection a command button and label can be added to frmMenu. The routine can compare the priv level attribute of the clsMenu object with clsSecurity's CurPrivilegeLevel property. If the object's priv_level can be greater than or equal to the CurPrivilegeLevel property then the command button can be enabled, otherwise it can be disabled. A disabled command button can appear "dimmed" to provide a visual indication to the user that the choice can be not available.

Menu Choice Selection: When the user selects a choice on the fhmMenu form, the selection can be logged to the central event logger with USER_EVENT severity and clsMenuInt's Sub SelectChoice( choice As Integer ) can be called. The routine can retrieve the clsMenu object (at index "choice") from the MenuChoice collection. Based on the value of its action_type attribute one of the following can occur:

Action Type "MENU": Indicates a new menu can be displayed. The name of the new menu can be located in the object's "action" attribute. The routine calls Sub UnloadCurrentMenu( ) which can erase the command buttons and labels on the form and can purge the MenuChoice collection. It then can call GetMenu( ) with the new menu name as the argument, which can extract the new menu from the database and can load the MenuChoice collection. It then can call RefreshMenu( ) to display the new menu choices.

Action Type "PROCEDURE": Indicates control can be transferred to a test executive internal procedure. The clsMenu object's "action" attribute can contain a keyword which can be used to identify the procedure to be called. The routine can call MapProcedure( [00a8] with the keyword as the argument.

Action Type "EXEC": Indicates an executable can be launched. The name of the executable can be located in the "action" attribute and the executable's path can be indicated by the "path" attribute. The routine can concatenate the "path" and "action" attributes to create a command line, use Visual Basic's Shell function, and launch the executable. This "hook" can provide test engineers with a mechanism to extend the test executive by allowing them to launch additional utilities and support programs.

cisMenuInt Narrative and Protocol Description: Can contain the private routines indicated above that allow for presentation and manipulation of menus. Protocol description:

Sub StartMainMenu( ): Can call the private GetMenu( ) sub with "MAIN" as the argument. Can load and display the main menu.

Sub SelectChoice( choice As Integer): Can be called by frmMenu in response to a user selection. Can execute the user's choice as described above.

clsMenu Protocol Description: clsMenu can be a methodless class private to the menu package. Each instance of clsMenu can contain the variables associated with a single menu selection. clsMenu can consist of the following public attributes:

text As String: Text to be displayed as a label on frmMenu for the menu choice.

privilege_level As Integer: Numeric value from 0 to 100 indicating the minimum user privilege level needed to activate this menu choice.

action_type As String: Can indicate the category of action to be taken in response to the user making this selection. Can be one of the following three values: MENU indicates a new menu can be displayed, PROCEDURE indicates control can shift to an internal procedure, EXEC indicates a new executable can be launched.

action As String: String value whose interpretation can be dependent upon action_type's value. For MENU action_type's this string can be the name of the new menu. For PROCEDURE action_type's this string can be a keyword that can be passed to the MapProcedure( [00a8] routine. For EXEC action_type's this string can be the name of the executable to be launched.

path As String: For MENU and PROCEDURE action_type's this can be "Not Executable". For EXEC action_type's the string contains the path for the executable to be launched.

MapProcedure Narrative: This routine can be simply a large select case (switch) that calls methods of the clsTestSet and clsSecurity objects. It can take a single string as a formal argument and attempt to match it with one of the known cases. If a match is made, the method can be called. An error can be raised if unable to make a match. One of the routines that can be included in MapProcedure can be a call to clsSecurity's Login method in response to a user request to Change the current user.

frmMenu Description: The form can contain labels for test set name, current user, current device under test, test mode and current selected batch. Values for these labels can be determined at form load time through inspection of clsTestSet and cisSecurity's public properties. The menu portion consists of a title label and a set of command buttons and associated labels. The values for these labels can be set by the clsMenuInt's RefreshMenu( ) routine. Disabled menu choices can be indicated by a "dimmed" command button. If the user selects a disabled choice it can be ignored (no error can be thrown). When the user selects an enabled choice clsMenuInt's SelectChoice( ) routine can be called with the choice number passed as the formal argument. The background color of the form can be dependent upon the current test set mode. For certification mode, light gray can be used. For experimental mode, red can be used. For standards mode, green can be used.

Database Usage: Can access the menus table to retrieve menu choice information.

Test Sequence Control Subsystem: The test sequence control package can consist of four classes and two forms. clsTestSet can be the principal class for the package and can contain the public interface for use by the remainder of the test executive. clsBatch can control the execution of a batch of tests. clsTest can configure and monitor a single test. clsDevice can be used to load and unload devices for test. The frmSelect form can display a list box to allow the user to choose from a set of values. The frmTimer form can hold a timer control used for test status polling.

clsTestSet Narrative and Protocol Description: Principal object for the package. Can contain properties read by other elements of the test executive and can contain methods which can be activated through menu selections (via the MapProcedure mechanism). Can contain an instance of clsBatch and clsDevice. Protocol description:

Sub RecoverState[00bf] ): Can be called by the Main( ) upon invocation of the test executive. Can retrieve state variables from the database and can set private data members that can be accessible via read-only properties. Can retrieve the following: test set name, test set mode, current device code, current device serial number and current batch name.

Name (Read only property): Name of test set.

Mode (Read only property): Test set mode. One of the following: CRT (certification), EXP (experimental), STD (standards).

DeviceCode (Read only property): DUT device code. Can delegate to clsDevice.

DeviceSerNum (Read only property): DUT serial number. Can delegate to clsDevice.

BatchName (Read only property): Name of current batch. Can delegate to clsBatch.

Sub ChangeMode( ): Can call Scribe to retrieve the set of valid test set modes from the database. Can launch frmSelect and fills the list box with the valid modes. Upon user selection, can update private data and can call Scribe to set the value of the "current_test_mode" database token.

Sub SelectBatch( ): Can call Scribe to retrieve the set of valid batch names from the database. Can launch frmSelect and fill the list box with the valid names. Upon user selection, can update clsBatch's Name property which loads the batch information.

Sub SelectDUT( ): Can delegate to clsDevice's SelectDevice method. Upon return, can set the test set mode to certification.

Sub RunBatch( ): Can delegate to clsBatch's Execute method.

clsBatch Narrative and Protocol Description: Can control test execution sequence and can perform retest logic in accordance with the Test Recovery Scheme. clsBatch can contain a collection of clsTest objects which represent the various tests of the batch. As a batch is executing, clsBatch can periodically poll the active clsTest objects, querying them as to their status (the timer control on frmTimer can be used to establish the polling interval). As each test completes, clsBatch can order the test to undergo limit checking. Based on the outcome of the limit checking process (passed, failed, aborted) the test recovery logic can be executed in accordance with the Test Recovery Scheme. clsBatch can maintain private collections to allow for the required flexible test recovery. Hierarchically a batch can be divided into rungs that can be further divided into steps that can be further divided into individual tests. Protocol description:

TestResult Enumeration: SPEC_PASSED, SPEC_FAILED, SPEC_INFO_ONLY, SPEC_ABORTED. This enumeration can indicate the outcome of a test or of the batch as whole. It can be returned by the limit checking process of each test and can be returned by the Execute method of clsBatch to indicate the outcome of the batch to clsTestSet.

Sub RecoverState( ): Can call Scribe to retrieve the value of the "current_batch" token and can set the Name property to this value.

Name (Read/Write Property): Can Get/Set the name of the current batch. When Name is changed, a new batch can be selected. The routine can use Scribe to retrieve the batch configuration and can load the private collections with rung/step and test information. A clsTest object can be created for each test, loaded with information from the database, and added to clsBatch's private Test collection.

Function Execute( ) As TestResult: Can execute the batch and can perform test recovery logic as documented in the Test Recovery Scheme (below).

clsTest Narrative and Protocol Description: The test object can control and monitor the execution of a single test. It can hold the configuration settings used by the test recovery scheme. It can parse the command line and can perform a Visual Basic Shell command to launch the test and can use the Scribe to monitor the test_status token. clsTest also can initiate the limits checking process upon command from clsBatch.

Props (Read/Write Property): Can hold a clsTestInfo methodless object that can contain the switches needed by the test recovery logic.

SiblingNum (Read/Write Property): Integer used to identify an individual test when multiple instances of the test can be running concurrently. If only one test can be running this can be set to one. This property can be set by clsBatch immediately prior to ordering each test to Execute.

Complete (Read only property): Boolean value. True can indicate test has completed. When read, the routine can use Scribe to query the value of the "test_status" token for the appropriate sibling number. If the value matches "complete" or "aborted" True can be returned, otherwise False can be returned.

Sub Execute( ): Can parse the command line and can call the Visual Basic Shell command to launch the test executable. Can call the Scribe to set the "test_status" token's value to "starting".

Function ApplyLimits( ) As TestResult: Can initiate the limit checking process for this test. Scribe can perform the limit checking and return a TestResult. This TestResult can be then passed up the call chain to the calling routine in clsBatch.

clsDevice Narrative and Protocol Description: Can hold the current device code and serial number. Can be used to load new devices for testing. Upon selection of a new device, the spec table can be inspected for the version of conditions and limits to be used for the device. A separate conditions and limits table can be maintained for each different test. The spec table can identify a version of conditions and limits dependent upon the device's code. A single device can refer to one version number for test conditions and a different version number for limits. Protocol description:

Code (Read only property): Can return the device code.

SerialNum (Read only property): Can return the device serial number.

Sub LoadDevice( ): Can use standard input boxes to get the code and serial number from the user. Can display a message box to the user for confirmation. Can order Scribe to retrieve database information regarding the new device and to construct the device token table/scratchpad for use by the test scripts. Can use Scribe to set the values for the "current_code" and "current_serial_number" tokens in the "test_set_state" table. Can update private data for code and serial number (accessible via the read-only properties). Can log the user's selection of the new device to the central event logger with USER_EVENT severity.

frmSelect Description: Can consist of a standard list box control, a command button for selection, and command button for abort. The list box can be filled by the using routine prior to displaying the form. When an element of the list is double clicked or if the command button for selection is pressed after single clicking an element of the list, the tag value for the list box can change state indicating to the using routine that the selection has been made. At that point, the using routine can read the current value of the list box and destroy the form.

frmTimer Description: A timer control can be used by clsBatch for polling intervals. Timer controls can be put on to a form in order to be used. This form can simply hold the timer for clsBatch. The form can be loaded by clsBatch but can be never made visible to the user.

Database Usage: Can retrieve and set state tokens in the test_set_state table (test_set_name,. test_set_mode, current_code, current_serial_num, current_batch, _test status). Can register tests in the test table. Can retrieve batch information from the batches table.

PACKAGING

Test Executive Support: The test executive can be dependent upon several support elements. For ease of installation and component management, several individual code components/classes can be packaged into related packages/DLL's. These packages can be referenced by the test executive's project profile in order to instantiate objects within the support packages. The test executive can be dependent upon the following packages:

System Objects Package: Contains the SystemError object which can be responsible for issuing ranges of error numbers for test suite code components and for determining the source of an error based on a given error number.

Support Library Package: Contains the string processing library, the math library, and the display support library.

Environment Package: Contains the command line switch processor, the test script coordinator, and the scribe class that provide the data interface layer.

Logger & Message Handler Package: Contains the central event logger and the message handler class used for inter-process communication.

Test Executive Packaging: The test executive itself can be built as a stand-alone Visual Basic executable. Visual Basic's built-in "Setup Wizard" can be used to construct a "Setup" disk image for the test executive. The test executive can be installed on any test set by connecting to this folder and double-clicking the "setup.exe" icon.

TEST RECOVERY SCHEME FOR AUTOMATED TEST SUITE

General Comments: Most known test software for dry plant circuit packs can be implemented as a single monolithic test. One of the principal complaints from circuit pack engineers and testers can be the inability of this software to back up and retest a failed element or start in the middle of the test. Thus, we redefine the test granularity and significantly improve the error recovery capability of each circuit pack test.

Definition of Terms

Test: A test can be a stand alone executable that implements a portion of the specification for a specific circuit pack. The test can be the smallest element of the specification that can be run independently or re-run in the case of failure. The test manager can issue each test a unique identifier. All data recorded in the database can be linked to this test ID. From the vantage point of the database, all measurement data can be linked to one and only one test. A record can be allocated in the global test table for each test and can include the following fields:

Test name.

Any test setup conditions (e.g. DUT temperature).

Overall specification version in effect.

Test specific specification version in effect.

Test set number.

Tester ID.

Start time.

Stop time.

Each test can have a list of prior test dependencies that must be executed before this test can start (e.g. if the RFD dictates retesting test #17, test #17 might require that test #1 and test #5 also be run). A test can receive any setup information via its command line.

Setup: Where the same test executable can be intended to be run multiple times against the same piece of product under different conditions (e.g. temperature) then the test can be considered to be run under a different "Setup". This can be different from a test executable that is intended to be run a single time against a piece of product but has product dependent conditions (e.g. two different product codes with a different operating temperature for a single test). Setup conditions can be delivered to the test script via its command line. Product dependent conditions can be delivered to the test script via the conditions table in the database. A test's setup conditions can be stored in the global test table in the database. Product dependent conditions can be stored in the zero-dimensioned measurement table for the test.

Batch: The batch can be a collection of tests intended to be run in sequence. The batch can be the smallest unit that can be selected by a tester to run. If a single test needs to be run, the tester can create and execute a batch consisting of the one test. Each circuit pack can have a "standard batch" that provides the normal certification test sequence for the pack. Each batch can be broken up into "rungs" which segregate tests by test set configuration. Each rung can be further broken up into "steps" defining the test sequences. The tester can be presented with the "standard batch". From this batch he tester can select which rungs/tests they wish to perform.

Rung: Each rung can be identified by name (e.g. 6 Degree Tests). The start of each rung can be indicated by a call to the Test Set Configuration Manager to changes/verify the configuration for the tests included in the rung. Each rung of the batch can contain the following:

A step providing instructions for the Test Set Configuration Manager for setting/veritying the configuration (e.g. changing temperature).

A step for each sequence of tests to be executed under the specified test set configuration.

Step: Each step can be identified by number and can include either instructions to the Configuration Manager or a test name and its associated command line switches. As the batch progresses, the test(s) for each step can be executed by the test manager. After the test(s) for a given step number has(have) completed, the next numeric step can be started. To have tests execute simultaneously, they can be given the same step number within a rung. Test Manager error recovery granularity can be limited to a step in a batch. Therefore, if a step includes tests that can be set to run concurrently, it can be assumed that they can run concurrently (i.e., tests can be set to run concurrently because they excite the device differently from the case where they can be run independently). Running a normally concurrent test independently can require editing the batch or creating a new batch consisting of just the one test. Each test step can have several state variables associated with it that can be defined as follows:

retry_on_failure. Integer indicating the number of times the tester will be offered the chance to retry this test if it fails. Can be zero.

abort_on_sister_abort: Boolean. Only pertinent to concurrent tests. If set, and the sister test aborts, the test will abort itself. If not set, the test c an continue to normal completion.

continue_batch_on_failure: Boolean. If set, the batch can continue despite the fact that the test failed. If not set, the batch can abort if the test failed.

Test Dependencies: A comma separated list of previous rungs/steps that can be performed prior to starting the current step.

Error Recovery

Failed Test: Upon completion of each step within a batch, the batch controller can inspect the test_status fields in the test_set_state table to determine the exit conditions for each test in the current step. If a test failed and the maximum number of retries indicated by retry on_failure have not been reached, the tester can be presented the option of re-running the current step. The failed test and any concurrent tests as indicated by the step number can be re-executed. Each re-executed test can get a new entry in the global test table and new test ID. Measurements can be inserted into the database as new records as opposed to overwriting the previous test results. If the maximum number of retries has been attempted and the test still fails, the test can be skipped. If the continue_batch_on_failure flag is set, the batch can continue, otherwise the batch can be aborted.

Tester Initiated Restart/Jump: At any point the tester can abort the current batch and either restart it from the beginning, restart at a selected rung/step, or edit the batch and restart the newly created batch. If restarting at a particular rung/step, the configuration step for that rung can be executed to ensure the set can be properly configured. While editing the batch, entire rungs can be selected/de-selected. Also, steps within a rung (other than the test set configuration step) can be selected/de-selected. The test set configuration step cannot be de-selected. To prevent the batch from changing the test configuration, the entire rung can be de-selected. Each re-executed test can get a new entry in the global test table and new test ID. Measurements can be inserted into the database as new records as opposed to overwriting the previous test results.

Program Initiated Restart/Jump: If a running test script determines that the product can not meet requirements as currently configured, a mechanism can be introduced to allow the test script to cause the batch to return to a previous step. A state variable "next_batch_step" can be provided in the test_set_state table that can be normally set to "next_step". Upon exiting the test script, the batch controller can regain control of the test set and inspects this field. If it can be set to "next step" the batch can inspect the test step's status fields and takes action as noted above. If, instead, the next_batch_step can be set to a rung/step combination, the batch can be restarted at the indicated point. The configuration step for the new rung can be executed followed by the indicated test step. All test steps from that point forward in the current batch can be executed. Each re-executed test can get a new entry in the global test table. Measurements can be inserted into the database as new records as opposed to overwriting the previous test results. If the indicated rung/step combination is not in the current batch (this case could be encountered during RFD retests) the batch can be aborted. Since the standard batch rung identifiers and step numbers can be expected to change over time, it can be important for the test script wishing to utilize this scheme to retrieve the target rung/step combination from the database as a test condition as opposed to hard coding it into the test script.

Intra-Test Error Recovery: If a running test script determines that there may be a problem with the test apparatus (e.g. bent fiber, bad RF cable connection), the test script can launch message boxes guiding the tester through a debug process. Once the problem has been resolved, the test script can re-perform the suspect measurements. This intra-test recovery can be performed "out of view" of the Test Manager (no new test ID's can be issued to allow data to be tracked separately). After resolution of the problem, new measurement data can be written over the top of the previous data for the test. If this is not the desired behavior, test script can guide the tester through resolution of the problem and then direct the tester to abort the test and restart it. After the abort, the test step can be restarted as a new test, with a new test ID, allowing the database to segregate the measurements accordingly.

Whereas the present invention has been described as being utilized in the context of an automated system for measuringm validating, and managing testing data from an optical device or system, the present invention is not limited to only being practiced in this context.

The disclosed embodiments are illustrative of the various ways in which the present invention may be practiced. Other embodiments can be implemented by those skilled in the art without departing from the spirit and scope of the present invention. For example, the automated testing system can also be used with non-optical products.

What is claimed is:

1. A method for validating previously stored measurements of an optical entity's performance against a predefined limit, said method comprising:

identifying a test variable;

identifying a limit related to the test variable;

comparing a measured value of the test variable against the limit; and building an object that includes an identity of the test variable, the measured value, the limit, and an indication of whether the measured value violates the limit.

2. The method of claim 1, further comprising:
indicating if the measured value violates the limit.
3. The method of claim 1, further comprising:
storing the object.
4. The method of claim 1, further comprising:
obtaining the limit.
5. The method of claim 1, further comprising:
obtaining the limit, wherein the limit is a string.
6. The method of claim 1, further comprising:
querying a table that relates the test variable to the limit.
7. The method of claim 1, further comprising:
inputting the limit; and
relating the test variable to the limit.
8. The method of claim 1, further comprising:
determining the limit; and
relating the test variable to the limit.
9. The method of claim 1, further comprising:
obtaining a guard band related to the limit.
10. The method of claim 1, further comprising:
determining a guard band related to the limit.
11. The method of claim 1, further comprising:
querying a table that relates the test variable to a guard band.
12. The method of claim 1, further comprising:
inputting a guard band related to the limit.
13. The method of claim 1, further comprising:
indicating if the test variable falls outside the limit.
14. The method of claim 1, further comprising:
indicating if the test variable matches the limit.
15. The method of claim 1, further comprising:
indicating if the test variable fails to match the limit.
16. The method of claim 1, further comprising:
indicating if the test variable falls outside a guard band associated with the limit.
17. A method for validating test measurements for an optical entity, said method comprising:

building an object that includes a test variable value, and a limit related to the test variable value;

comparing the test variable value against the limit; and indicating if the test variable violates the limit.

18. The method of claim 7, further comprising:
identifying a test.
19. The method of claim 7, further comprising:
identifying a test variable.
20. The method of claim further comprising:
obtaining a test variable value measured during a test.
21. The method of claim 7, further comprising:
obtaining the limit for the test variable value.
22. The method of claim 7, further comprising:
creating a validation result that indicates if the test variable value violates the limit.

23. The method of claim 7, further comprising:

revising the object to include an indication of whether the test variable value violates the limit.

24. The method of claim 7, further comprising:

storing the object.

25. The method of claim 7, further comprising:

changing the limit.

26. A computer memory containing data that relates to performance testing, the data comprising:

a test identifier;

a test variable identifier; and a plurality of independent variable identifiers.

wherein the data are adapted to be stored as a file having a filename.

27. The memory of claim 26; wherein said filename includes said test identifier.

28. The memory of claim 26, wherein said filename includes said test variable identifier.

29. The memory of claim 26, wherein said filename includes at least one independent variable identifier from said plurality of independent variable identifiers.

30. The memory of claim 26, wherein said filename includes said test identifier, said test variable identifier, and at least one independent variable identifier from said plurality of independent variable identifiers.

31. The memory of claim 26, wherein said filename includes at least one separator.

32. The memory of claim, wherein said filename includes at least one separator, said separator being an underscore character.

33. The memory of claim 26, wherein said filename includes said test identifier, at least one independent variable identifier from said plurality of independent variable identifiers, and at least one separator separating said test identifier from said at least one independent variable identifier from said plurality of independent variable identifiers.

34. A computer-readable medium having stored thereon instructions for validating test measurements for an optical entity, the instructions when executed by a processor cause the processor to:

build an object that includes a test variable value, and a limit related to the test variable value;

compare the test variable value against the limit; and indicate if the test variable violates the limit.

35. The computer-readable medium of claim 34, having stored thereon instructions that when executed by the processor further cause the processor to:

identify a test.

36. The computer-readable medium of claim 34, having stored thereon instructions that when executed by the processor further cause the processor to:

identify a test variable.

37. The computer-readable medium of claim 34, having stored thereon instructions that when executed by the processor further cause the processor to:

obtain a test variable value measured during a test.

38. The computer-readable medium of claim 34, having stored thereon instructions that when executed by the processor further cause the processor to:

obtain the limit for the test variable value.

39. The computer-readable medium of claim 34, having stored thereon instructions that when executed by the processor further cause the processor to:

create a validation result that indicates if the test variable value violates the limit.

40. The computer-readable medium of claim having stored thereon instructions that when executed by the processor further cause the processor to:

revise the object to include an indication of whether the test variable value violates the limit.

41. The computer-readable medium of claim 34, having stored thereon instructions that when executed by the processor further cause the processor to:

store the object.

42. The computer-readable medium of claim 34, having stored thereon instructions that when executed by the processor further cause the processor to:

change the limit.

* * * * *